(12) United States Patent
Kellerman et al.

(10) Patent No.: US 6,648,230 B1
(45) Date of Patent: Nov. 18, 2003

(54) METHOD AND APPARATUS FOR EVALUATING A CONFIDENCE LEVEL OF A DECODED BARCODE

(75) Inventors: Eduardo Kellerman, Endicott, NY (US); Richard C. Van Hall, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/154,241

(22) Filed: May 22, 2002

(51) Int. Cl.[7] ................................................ G06K 7/20
(52) U.S. Cl. .............................. 235/462.5; 235/462.11; 235/462.01; 235/375; 705/408; 705/404; 705/410
(58) Field of Search ....................... 235/462.25, 462.11, 235/462.01, 375; 705/408, 404, 410

(56) References Cited

U.S. PATENT DOCUMENTS

| | | | |
|---|---|---|---|
| 5,428,211 A | * 6/1995 | Zheng et al. | ........... 235/462.02 |
| 5,495,097 A | 2/1996 | Katz et al. | |
| 5,608,200 A | * 3/1997 | Le Goff et al. | ......... 235/462.02 |
| 5,862,243 A | 1/1999 | Baker et al. | |
| 5,929,421 A | 7/1999 | Cherry et al. | |
| 5,936,224 A | 8/1999 | Shimizu et al. | |
| 5,974,147 A | 10/1999 | Cordery et al. | |
| 6,058,190 A | 5/2000 | Cordery et al. | |
| 6,102,289 A | 8/2000 | Gabrielson | |
| 6,176,428 B1 | * 1/2001 | Joseph et al. | ............. 235/462.1 |
| 6,363,484 B1 | * 3/2002 | Cordery et al. | ............. 713/182 |
| 6,367,698 B1 | * 4/2002 | Yamamoto et al. | ..... 235/462.11 |

* cited by examiner

*Primary Examiner*—Karl D. Frech
*Assistant Examiner*—Allyson Sanders
(74) *Attorney, Agent, or Firm*—Leland D. Schultz; Antony P. Ng; Bracewell & Patterson, L.L.P.

(57) ABSTRACT

A method and apparatus for evaluating a confidence level of a decoded barcode value is disclosed. A digit score is assigned to a digit within a barcode. When decoding the barcode, if a deduction is required to decode the digit, then the digit score for the digit is reduced accordingly. After all the digits within the barcode have been decoded, a total score of a decoded barcode value can be determined by adding all the digit scores for all the digits within the barcode. The total score of the decoded barcode value is reduced if a checksum is used to ascertain the value of any digit within the barcode. The decoded barcode value can be accepted only if the total score exceeds a predetermined value.

15 Claims, 3 Drawing Sheets

METHOD AND APPARATUS FOR EVALUATING A CONFIDENCE LEVEL OF A DECODED BARCODE

BACKGROUND OF THE INVENTION

1. Technical Field

The present invention relates to mail handling in general, and in particular to a method and apparatus for evaluating barcode on mails. Still more particularly, the present invention relates to a method and apparatus for evaluating a confidence level of a decoded barcode from a mail piece.

2. Description of the Related Art

In recent years, the United States Postal Service (USPS) has adopted a new form of zip codes that contains more detailed destination information than the original five-digit zip codes. The so-called ZIP+4 zip code contains an additional four-digit extension that generally identifies an address within a side of residential block. A further enhancement to the zip code system is the utilization of a 11-digit zip code to specify a point of delivery.

In conjunction with the new zip code system, the USPS also developed the Postal Numeric Encoding Technique (POSTNET) to provide an optimized barcode system for encoding zip code information on mail pieces. As an inducement to mailers to prepare their mails in such a way so as to bring about faster mail delivery, the USPS offers postage discounts to mailers for mail items such as presorted mail. Postage discounts are also given to mailers when mails are pre-printed with a 11-digit zip code in an approved barcode format.

Even if a mail piece does not have a pre-printed barcode, the USPS can provide the mail piece with a POSTNET barcode. This is because barcoding enable mail sorting machines to sort and route mails in a more rapid fashion. Generally speaking, the digits in a POSTNET barcode are encoded using a fixed number of tall bars and a fixed number of short bars. In order to guard against errors, two levels of redundancy are incorporated within each POSTNET barcode. The first level of redundancy is in the way digits are encoded. Each digit is encoded in a way that the location of a tall bar can be deduced from the locations of all short bars, and vice versa. The second level of redundancy is the inclusion of a correction digit to the entire 11-digit zip code. The inclusion of a correction digit ensures that the sum of all the digits (i.e., checksum) within a POSTNET barcode is a multiple of 10. Thus, if a digit within a POSTNET barcode cannot be decoded, the checksum can be used to determine such.

Even with the two levels of built-in redundancy as mentioned above, errors will still occur when decoding a POSTNET barcode. Thus, it would be desirable to provide a method and apparatus for evaluating a confidence level of a decoded POSTNET barcode.

SUMMARY OF THE INVENTION

In accordance with a preferred embodiment of the present invention, a digit score is assigned to a digit within a barcode. When decoding the barcode, if a deduction is required to decode the digit, then the digit score for the digit is reduced accordingly. After all the digits within the barcode have been decoded, a total score of a decoded barcode value can be determined by adding all the digit scores for all the digits within the barcode. The total score of the decoded barcode value is reduced if a checksum is used to ascertain the value of any digit within the barcode. The decoded barcode value can be accepted only if the total score exceeds a predetermined value.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
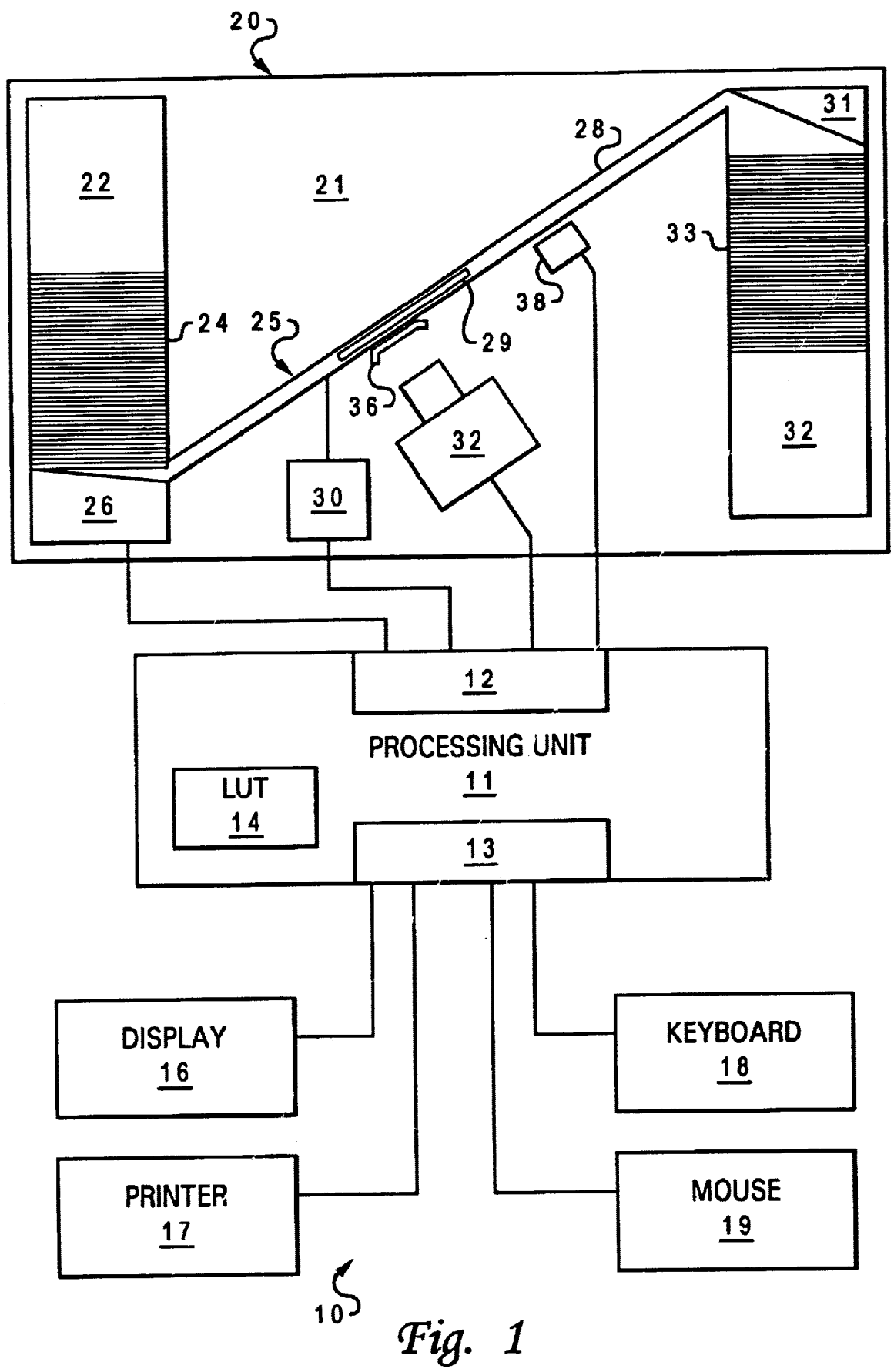
FIG. 1 is a mail piece barcode evaluation station in accordance with a preferred embodiment of the present invention.

Referring now to the drawings and in particular to FIG. 1, there is depicted a mail piece barcode evaluation station in accordance with a preferred embodiment of the present invention. As used herein, "mail" or "mail piece" is defined as an item entrusted with the United States Postal Service (USPS) or a private delivery organization for transport to a destination designated by a mailer. As shown, a mail piece barcode evaluation station 10 includes a mail handler 20 coupled to a processing unit 11. Preferably, processing unit 11 is a ruggedized industrial-grade personal computer having customized hardware and software to interface with various components of mail piece barcode evaluation station 10. Processing unit 11 controls selected operations performed by mail handler 20 through a mail handler interface 12. Processing unit 11 is also coupled to a number of input/output (I/O) devices via an I/O interface 13. Such I/O devices may include a display 16, a printer 17 a keyboard 18, and a mouse 19.

Furthermore, processing unit 11 includes a look-up table (LUT) 14 configured to determine at least a portion of an address corresponding to a proper mail piece barcode, such as a Postal Numeric Encoding Technique (POSTNET) barcode. LUT 14 is preferably entered with data obtained from scanning a mail piece barcode to produce at least a portion of a corresponding multi-character address. The decoded address may be further processed to verify accuracy of the mail piece barcode. LUT 14 may reside in a storage medium coupled to processing unit 11. Preferably, the storage medium is a readable/writable memory device that may be readily updated as the mail piece barcode standard changes.

Mail handler 20 includes a bed 21 that defines a feed bin 22, a transport system 25, and a stacker 31. Feed bin 22 holds mail pieces in a mail row 24 for evaluation. Transport system 25 selectively moves mail pieces one at a time from feed bin 22. Transport system 25 includes a feeder 26, a transport path 28 and a transport controller 30. Feeder 26 selectively feeds mail pieces from mail row 24 to transport path 28. Transport of a mail piece, such as a mail piece 29 shown in transport path 28, is controlled by transport controller 30. In FIG. 1, the direction of travel provided by transport system 25 is generally from left to right, although in other embodiments, the direction of travel path of mail pieces may differ. Transport system 25 also includes pinch rollers or belt conveyors (not shown) to transport mail pieces.

An imaging device 32 is configured to selectively provide a signal corresponding to an image of an item viewed adjacent platten 36. Preferably, imaging device 32 is a line scan camera that generates an electric signal corresponding to a scanned image. Alternatively, imaging device 32 may be an area camera, an array of optical sensors, or other imaging device. After passing through imaging device 32, a mail piece is then transported to print head 38. Print head 38 selectively marks the mail piece in transport path 28. Preferably, print head 38 is of the ink jet variety. Alternatively, another type of marking device may be used. Mail piece exits transport path 28 into a collection bin 32. Collection bin 32 holds a mail row 33 after processing along transport path 28. Stacker 31 assembles and maintains evaluated mail row 33. Instead of collection bin 32, other embodiments may transport mail pieces to a tray or other device after processing in mail handler 20.

Processing unit 11 coordinates and controls various operations of mail piece barcode evaluation station 10 via mail handler interface 12. Mail handler interface 12 includes operative links to feeder 26, transport controller 30, imaging device 32, and print head 38. Processing unit 11 includes barcode requirements data that provides information pertinent to the acceptability of a barcode.

Figure 2:
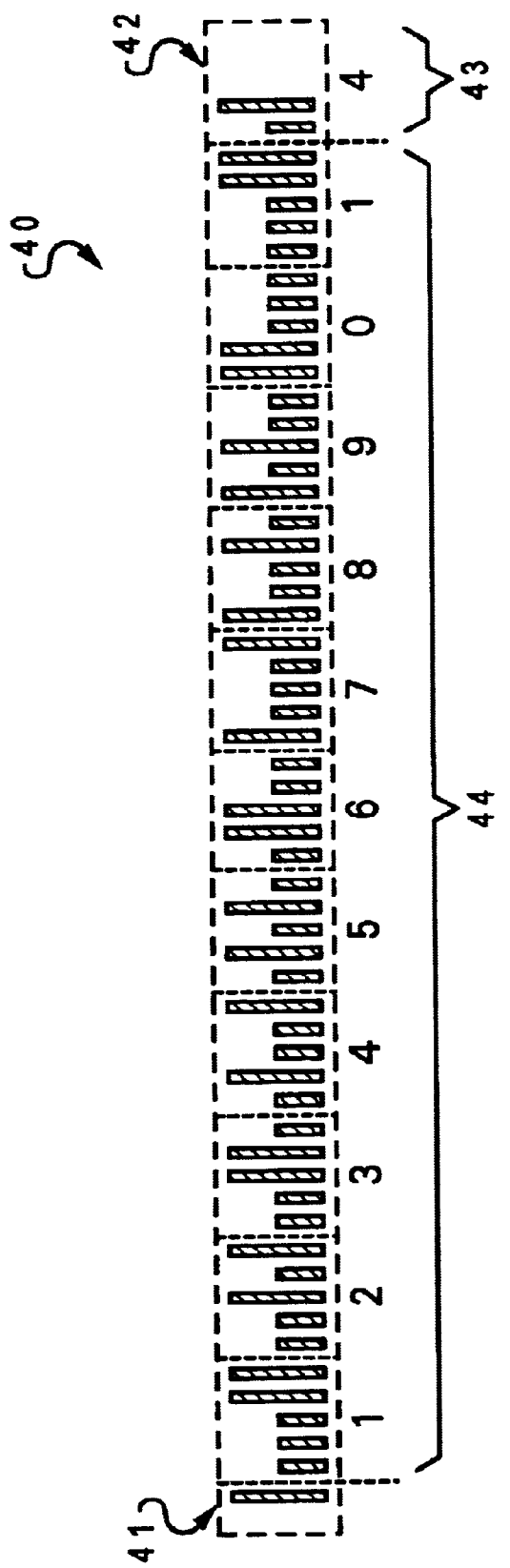
FIG. 2 is a diagram of a POSTNET barcode to which a preferred embodiment of the present invention is applicable.

With reference now to FIG. 2, there is depicted a diagram of a POSTNET barcode to which a preferred embodiment of the present invention is applicable. As shown, a POSTNET barcode 40 includes a beginning frame bar 41 and an ending frame bar 42. Each digit within POSTNET barcode 40 is encoded using two tall bars and three short bars. Two levels of decoding redundancy are included within POSTNET barcode 40. First, for each digit, the location of a tall bar can be deduced from the locations of the three short bars, and the location of a short bar can be deduced from the locations of the two tall bars. Second, a correction digit 43 is provided, in addition to a 11-digit zip code 44, to ensure that the sum of all the barcode digits (i.e., a checksum) is a multiple of 10. As such, if one digit within POSTNET barcode 40 is unreadable during decoding, the checksum can be used to determine the value of the digit.

If one or both of the above-mentioned two levels of redundancy must be used in order to decode POSTNET barcode 40, less confidence should be placed in a decoded value of POSTNET barcode 40. The following criteria can be used as a measure of that confidence:

a. each digit within a barcode contributes a proportional or equal value towards a total score of 100;
b. the number of ambiguous, absent, or out-of-bounds bars is counted against each digit;
c. a digit with one "bad" bar reduces the allotted value of its score, preferably by 50%;
d. a digit with more than one "bad" bar does not contribute any value to its score; and
e. if the checksum is used to determine the number of a digit that could not be decoded, the total score is reduced, preferably by 10%.

The total score is the sum of the scores of all the digits within a barcode. If the total score is higher than a predetermined cutoff value, then the decoded barcode value should be kept; otherwise, the decoded barcode value should be discarded because of its low confidence level. In the current example, only the total score is used to decide whether a decoded barcode value should be kept or discarded. However, when more than one decoding algorithm is being used to perform barcode decoding, the total score can be used to decide whether or not a decoded barcode value determined by one decoding algorithm needs to be verified or checked by another decoding algorithm.

The predetermined cutoff value to be used as the cutoff point of the total score varies from one mail piece barcode evaluation system to another, and can be determined experimentally. This is necessary because the predetermined cutoff value heavily depends on a specific decoding algorithm as well as the type of mail piece (i.e., letters, flats, etc.) and the quality of the printed barcode.

Figure 3:
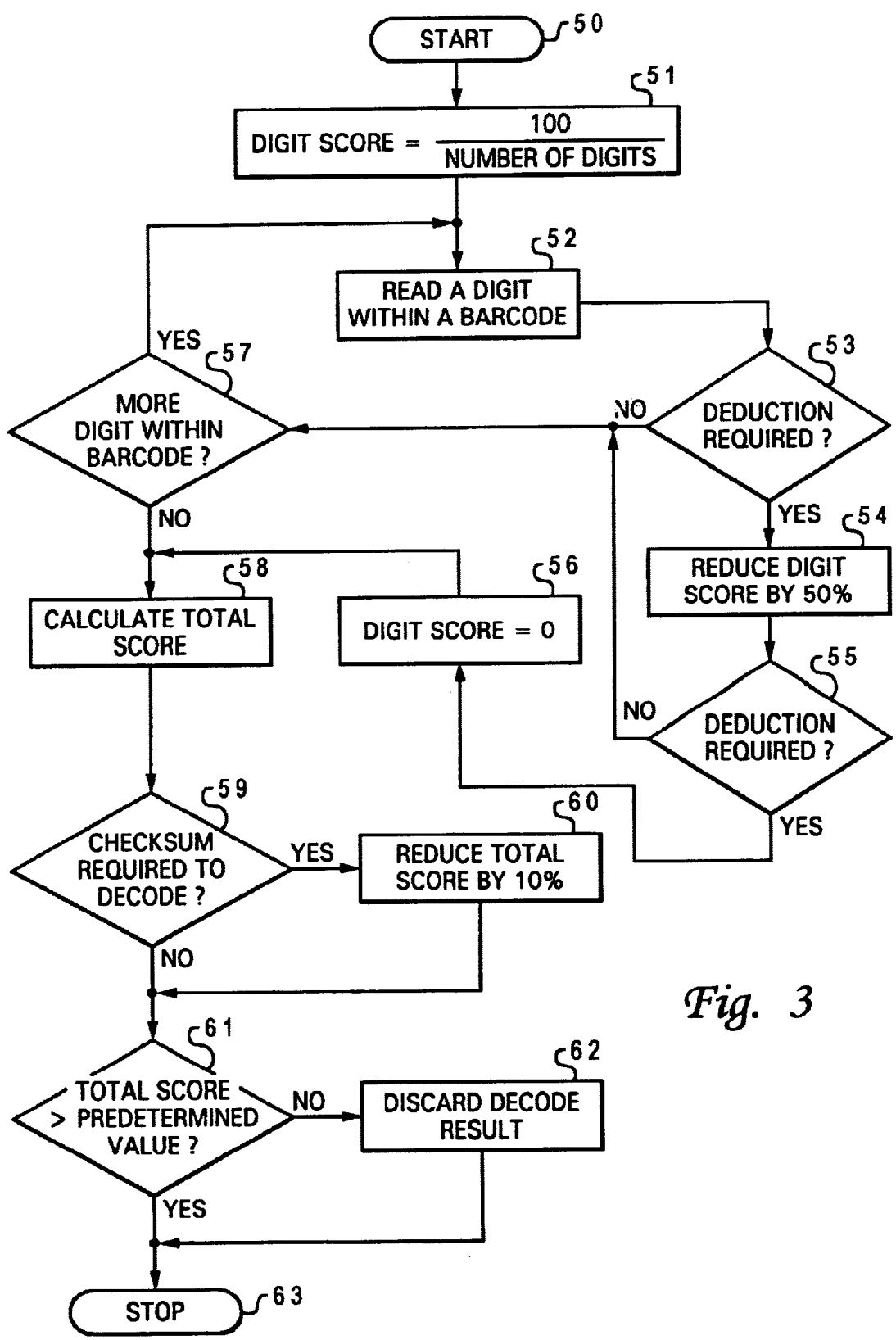
FIG. 3 is a high-level logic flow diagram of a method for determining a confidence level of a decoded barcode from a mail piece, in accordance with the preferred embodiment of the present invention.

Referring now to FIG. 3, there is illustrated a high-level logic flow diagram of a method for determining a confidence level of a decoded barcode, in accordance with the preferred embodiment of the present invention. Starting at block 50, a digit score is calculated, as shown in block 51, via dividing 100 by the total number of digits within a POSTNET barcode. For example, if there are 12 digits (i.e., a 11-digit zip code plus a correction digit) within a POSTNET barcode, then each digit score=100/12. A digit within a POSTNET barcode is read, as depicted in block 52. A determination is then made as to whether or not a deduction (i.e., using all tall bars within the digit to deduce the location of a short bar, or vice versa) is required to ascertain the location of a bar within the digit, as shown in block 53. If a deduction is required, the digit score for the digit is reduced by 50%, as depicted in block 54. Then, another determination is made as to whether a second deduction is required to ascertain the location of another bar within the same digit, as shown in block 55. If a second deduction is required, the digit score for the digit is set to zero, as depicted in block 56.

The above-mentioned steps are repeated until all the digits within the POSTNET barcode have been evaluated, as shown in block 57. Next, a total score is calculated by adding all the digit scores of the digits within POSTNET barcode, as depicted in block 58. A determination is then made as to whether or not a checksum was required to ascertain the value of any digit within the POSTNET barcode, as shown in block 59. If the checksum is required, the total score is reduced by 10%, as depicted in block 60. Otherwise, a determination is made as to whether or not the total score exceed a predetermined cutoff value, as shown in block 61. If the total score does not exceed a predetermined cutoff value, the decoded barcode value is discarded because of its unreliability, as depicted in block 62. In addition to discarding the decoding result, the mail piece having the POSTNET barcode can be sent to a different mail piece barcode evaluation system to further decode the POSTNET barcode. For example, an alternate decoding algorithm can be used to verify the decoded barcode value. Otherwise, if the total score exceeds the predetermined cutoff value, the decoded barcode value can be accepted and the process is completed, as shown in block 63.

As has been described, the present invention provides a method and apparatus for determining a confidence level of a decoded barcode. Although POSTNET barcode is used to illustrate the present invention, it is understood by those skilled in the art that the present invention is also applicable to other types of zip code encoding techniques, such as Postal Alpha Numeric Encoding Technique (PLANET).

While the invention has been particularly shown and described with reference to a preferred embodiment, it will be understood by those skilled in the art that various changes in form and detail may be made therein without departing from the spirit and scope of the invention.

What is claimed is:

1. A method for determining a confidence level of a decoded barcode, said method comprising:

assigning a digit score to a digit within a barcode;

reducing said digit score if a deduction is required to decode said digit;

determining a total score of a decoded barcode value by adding digit scores for all digits within said barcode;

reducing said total score if a checksum is used to ascertain the value of any digit within said decoded barcode value; and accepting said decoded barcode value if said total score exceeds a predetermined value.

2. The method of claim 1, wherein said reducing said digit score further includes reducing said digit score by 50% if a deduction is required to decode said digit.

3. The method of claim 2, wherein said method further includes setting said digit score to zero if a second deduction is required for decoding said digit.

4. The method of claim 1, wherein said reducing said total score further includes reducing said total score by 10% if a checksum is used to ascertain the value of any digit within said decoded barcode value.

5. The method of claim 1, wherein said assigning a digit score further includes assigning an identical digit score to each digit within said barcode.

6. A computer program product residing on a computer usable medium for determining a confidence level of a decoded barcode value, said computer program product comprising:

program code means for assigning a digit score to a digit within a barcode;

program code means for reducing said digit score if a deduction is required to decode said digit;

program code means for determining a total score of a decoded barcode value by adding digit scores for all digits within said barcode;

program code means for reducing said total score if a checksum is used to ascertain the value of any digit within said decoded barcode value; and program code means for accepting said decode barcode value if said total score exceeds a predetermined value.

7. The computer program product of claim 6, wherein said program code means for reducing said digit score further includes program code means for reducing said digit score by 50% if a deduction is required to decode said digit.

8. The computer program product of claim 7, wherein said computer program product further includes program code means for setting said digit score to zero if a second deduction is required for decoding said digit.

9. The computer program product of claim 6, wherein said program code means for reducing said total score further includes program code means for reducing said total score by 10% if a checksum is used to ascertain the value of any digit within said decoded barcode value.

10. The computer program product of claim 6, wherein said program code means for assigning a digit score further includes program code means for assigning an identical digit score to each digit within said barcode.

11. A mail piece barcode evaluation system capable of determining a confidence level of a decoded barcode, said mail system comprising:

means for assigning a digit score to a digit within a barcode;

means for reducing said digit score if a deduction is required to decode said digit;

means for determining a total score of a decoded barcode by adding digit scores for all digits within said barcode;

means for reducing said total score if a checksum is used to ascertain the value of any digit within said decoded barcode value; and means for accepting said decoded barcode value if said total score exceeds a predetermined value.

12. The system of claim 11, wherein said means for reducing said digit score further includes means for reducing said digit score by 50% if a deduction is required to decode said digit.

13. The system of claim 12, wherein said system further includes means for setting said digit score to zero if a second deduction is required for decoding said digit.

14. The system of claim 11, wherein said means for reducing said total score further includes means for reducing said total score by 10% if a checksum is used to ascertain the value of any digit within said decoded barcode value.

15. The system of claim 11, wherein said means for assigning a digit score further includes means for assigning an identical digit score to each digit within said barcode.

* * * * *